United States Patent [19]

Troeder et al.

[11] 4,450,729
[45] May 29, 1984

[54] DEVICE FOR MEASURING AND MONITORING THE DRIVE OF AN AGRICULTURAL IMPLEMENT

[75] Inventors: Christoph Troeder; Manfred Faber, both of Aachen; Peter Seigert, Lohmar, all of Fed. Rep. of Germany

[73] Assignee: Jean Walterscheid GmbH, Lohmar, Fed. Rep. of Germany

[21] Appl. No.: 361,834

[22] Filed: Mar. 25, 1982

[30] Foreign Application Priority Data

Mar. 31, 1981 [DE] Fed. Rep. of Germany ....... 3112714

[51] Int. Cl.³ .............................................. G01L 3/10
[52] U.S. Cl. ................................................ 73/862.34
[58] Field of Search ...................................... 73/862.34

[56] References Cited

U.S. PATENT DOCUMENTS

| | | | |
|---|---|---|---|
| 3,194,065 | 7/1965 | Wilson | 73/862.34 |
| 3,295,367 | 1/1967 | Rundell | 73/862.34 |
| 4,085,612 | 4/1978 | Rundell | 73/862.34 |
| 4,183,243 | 1/1980 | Brown | 73/862.34 |
| 4,186,597 | 2/1980 | Brown | 73/862.34 |

FOREIGN PATENT DOCUMENTS

| | | | |
|---|---|---|---|
| 2815463 | 11/1978 | Fed. Rep. of Germany . | |
| 2332110 | 12/1978 | Fed. Rep. of Germany . | |
| 1509098 | 12/1967 | France | 73/862.34 |
| 1008494 | 10/1965 | United Kingdom | 73/862.34 |
| 1395911 | 5/1975 | United Kingdom | 73/862.34 |

*Primary Examiner*—Howard A. Birmiel
*Attorney, Agent, or Firm*—Toren, McGeady and Stanger

[57] ABSTRACT

A device capable of monitoring the drive shaft line of an agricultural implement which may be subjected to a high degree of irregularity in a manner whereby either instantaneous loads are transmitted to a tractor operator by analog or quasi-digital indications and adapted for inclusion of adjusting and control functions having a measuring shaft with a pair of toothed wheels arranged at opposite ends thereof with differential sensors provided in cooperative relationship with the toothed wheels to sense phase displacement between the toothed wheels proportional to torque occurring at the measuring shaft. Each of the toothed wheels is supported axially outwardly thereof by a pair of journals mounted in bearings of a housing which includes a resilient member for accommodating the device to bending forces.

6 Claims, 5 Drawing Figures

DEVICE FOR MEASURING AND MONITORING THE DRIVE OF AN AGRICULTURAL IMPLEMENT

The present invention relates generally to a device for sensing torque in the drive shaft of a power supply mechanism and more particularly to a device for measuring and monitoring instantaneous values of torque, speed, and possibly shaft performance, which may be obtained by multiplying the values of torque and speed, particularly useful in connection with the drive shaft line arranged between a power take off shaft of a tractor and an agricultural implement.

A device of the type to which the present invention relates basically consists of a torsion-loaded measuring shaft having identically designed toothed wheels nonrotatively attached at both ends thereof. Connecting journals are arranged on the axially outward sides of both of the toothed wheels and a housing member is provided which includes bearing supports for the connecting journals. Differential sensor devices allocated to each of the toothed wheels operate in a contact-free manner to sense phase displacement between the toothed wheels proportional to the torque occurring therein and the overall device is sealed with a housing member within which the operative elements are mounted.

Contact-free torque and speed measuring systems whereby multiplication of two values provides information on the performance of a mechanism to be monitored are known from German Auslegeschrift No. 23 32 110. In the measuring system described therein, a shaft is provided with toothed or punched wheel elements producing signal pulses, and a second shaft extending axis-parallel with the first shaft is provided with toothed or punched exciter wheels arranged in the wheel plane of the wheels, with each wheel pair cooperating with the assistance of measuring sensors for producing signal pulses.

The signals received are processed in an appropriate manner and converted in a multiplier to a signal proportional to performance of the device being monitored. Because of the provision of two axis-parallel shafts, the system described above has been found unsuitable for use in the power train between a tractor and an agricultural implement. A principal difficulty which arises in connection with such an application is that the space between the tractor and the agricultural implement does not provide sufficient room for the installation of a measuring assembly having such large dimensions. Additionally, a device which involves open, unprotected rotating parts is incapable of use with such agricultural equipment for both safety and technical reasons and it has been found, due to reasons of space, to be impossible to fit an appropriate cover for such an assembly.

A further torque measuring coupling which operates in a contact-free manner is described in German Offenlegungsschrift No. 28 15 463. In this device, a pair of toothed wheels serving as data transmitters are fixed to a shaft at an appropriate distance and shaft pulses of the same frequency but with torque-dependent phase displacement are produced. Additionally, an electronic evaluating system is provided with a pulse generator which serves to evaluate a number of pulses corresponding to the phase differences and thereby to the torque to be measured. In a manner known, per se, the pulses are plotted by a digital plotter and are transferred to an indicating unit.

Because of the high degree of irregularity to which drive mechanisms for tractors and other similar agricultural implements are subjected, which irregularity is intensified by articulated cardan or universal joints, it is impossible to read the digital indications described.

The present invention is accordingly directed toward provision of a device having an overall design which permits it to be used in a drive line which when in operation may be subjected to high degrees of irregularity. The invention is intended to provide a device which is capable of receiving transverse forces occurring in a universal joint when the joint is articulated without suffering any damage and which may be placed in a position to indicate to a tractor driver loads occurring in the drive shaft line during operation of the agricultural implement and, also, to enable the possibility to introduce adjusting and control functions.

SUMMARY OF THE INVENTION

Briefly, the present invention may be described as a device for measuring torque and other parameters in a drive shaft particularly for use in the drive line between the power take off shaft of a tractor and an agricultural implement comprising: a torsion-loaded measuring shaft; a pair of toothed wheels rotatively fixed, respectively, at opposite ends of said shaft; connecting journals adjacent each of said toothed wheels axially outwardly thereof, said connecting journals being dimensioned with a diameter which is approximately twice the diameter of said measuring shaft; housing means including a pair of bearing support means each having bearings for rotatably supporting said connecting journals, a resilient tubular member extending between said bearing support means and bracket means connecting said bearing support means together in rotatively fixed engagement; and differential sensor means supported on said bearing support means in contact-free operative association with said toothed wheels to sense phase displacement therebetween proportional to torque in said measuring shaft.

In accordance with the invention, the objectives thereof are achieved in that the differential sensors are arranged at the bearing support means in the housing means. The bearing support means are arranged in the axial direction to be held by means of the bearings on the connecting journals. The connecting journals which are arranged adjacent the toothed wheels on the axially outward side thereof are formed with approximately twice the diameter of the measuring shaft and the housing means are constructed to include a tubular member covering the bearing housings and having a resilient characteristic. Furthermore, the bearing support members are nonrotatively joined together by the bracket means.

As a result of the specific arrangement of the measuring device in accordance with the present invention, it is possible to arrange the device with one end thereof directly connected on the power take off shaft of a tractor and with the other end thereof directly connected with the universal joint of the power train. High transverse forces which occur when the universal joint is articulated and which may result when the measuring shaft is bent, will not affect the indications of the measured values because the type of support structure of the bearing housing on the connecting journals together with the elastic or resilient outer tubular cover of the bearing housing will ensure that a constant distance is maintained between the differential sensors which are arranged to be supported at the bearing support members and the toothed wheels serving as the data transmitters. The bearing housing will essentially thereby respond to the bending characteristics of the measuring shaft.

In accordance with a further advantageous feature of the invention, each of the toothed wheels is provided with a bearing collar at its outer circumference which is directed axially inwardly for receiving a further support bearing.

This measure ensures a constant position of the differential sensors relative to the toothed wheels and is particularly suitable for application in high performance implements.

In one advantageous preferred embodiment of the invention, the differential sensors are designed as differential magnetoresistor sensors.

The differential magnetoresistor sensors permit easy recording of the phase displacement in the two differential sensors occurring due to the torque produced in the measuring shaft and of the speed of the loaded shaft.

In a further embodiment of the invention, the differential sensors are designed as inductive sensors. By utilizing inductive sensors, the temperature range suitable for application of the measuring device may be extended.

In a special embodiment of the invention, a drive shaft which forms the component of a known machine serves as a measuring shaft and hollow connecting journals are provided with the journals being fixed to the drive shaft.

By designing the measuring device in such a manner, it is possible to utilize the device inside the drive line of a working machine which may be subjected to the possible damaging effects.

In accordance with a further feature of the invention, an electronic evaluating system is provided having a switching mechanism which consists essentially of one inverting and one noninverting operational amplifier with the operational amplifiers being wired as a comparator whose outputs are transmitted through a NOR gate to a first low-pass filter connected to the output side of the NOR gate for recording torque. The output of the noninverted operational amplifier is also applied to a frequency voltage transformer and through a second low-pass filter connected to the output of the frequency voltage transformer for recording speed. The outputs of the first and the second low-pass filters are applied in a multiplier combining the torque and speed data for obtaining a performance parameter.

The electronic evaluating system of the invention consists of few components and only requires very little space and it may therefore be consequently fitted in the operator's cabin of a tractor.

Additionally, the mechanism may be used for effecting adjusting and control functions outside the tractor cabin both at the tractor itself and at a suitable and protected place at the implement.

It is advantageous that the electronic evaluating system may supply control or measurement values independently of the irregularity of the rotary movement. By using the measuring device of the invention, the operating technique of an agricultural implement may be optimized to a considerable extent.

In particular, when it is required to evenly work soil, it is possible to predetermine, for example, a constant performance parameter which may be controlled by means of the values obtained from the measuring device of the invention. Furthermore, it is possible for example to control the speed of the tractor engine in order to obtain a uniform tractor speed for certain operating processes. Such uniform speed may be necessary during operation, for example, in connection with seed distributors to ensure even distribution of the seeds.

Additionally, the measuring device of the invention is capable of recognizing at an early stage any blockages which might frequently occur in a harvesting vehicle and to enable the drive of the vehicle to be stopped by means of an additional switching clutch. Further advantages of the measuring device of the invention consist in the fact that when the device is fitted on the implements or implement components which may be endangered by foreign objects, it will react to metals in a manner similar to metal detectors commonly used today. If the machine is struck by objects such as pieces of wood or stones which might cause immediate increase in the torque in the drive system, the device of the invention will react thereto and may operate to switch off the drive in sufficient time to prevent damage.

With a device such as that of the present invention, instantaneous load on the implement or efficiency achieved in respective working processes may be indicated to the tractor driver in the simplest manner by analog or quasi-digital indications in the form of LED displays. Of course, in order to indicate preferred working areas, such LED displays may be provided in multicolored arrangements.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
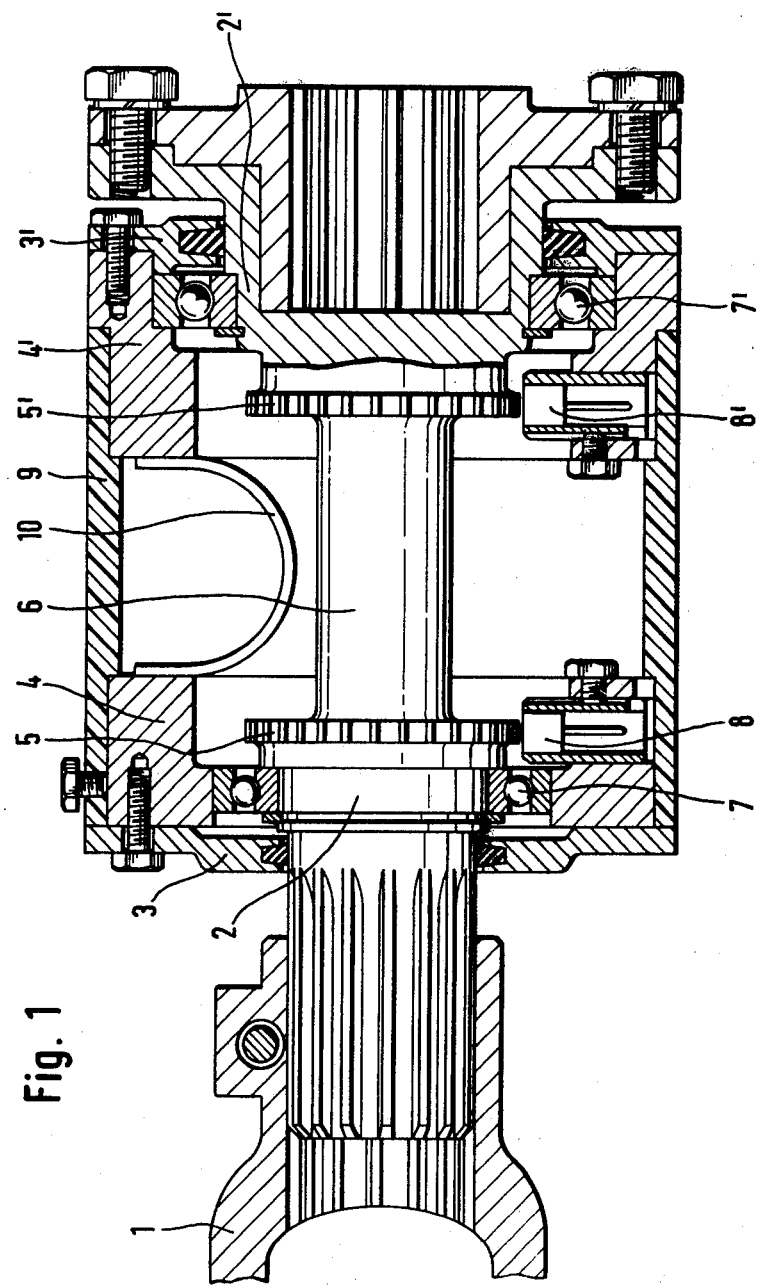
FIG. 1 is a sectional view of a measuring mechanism in accordance with the present invention which is connected directly with the yoke of a universal joint.

Referring now to the drawings, and particularly to FIG. 1 which shows a first embodiment of the invention, the measuring device in accordance with the invention shown in FIG. 1 consists essentially of a measuring shaft 6 which is equipped at both ends thereof with toothed wheels 5 and 5' which have been arranged as data transmitters. On the axially outward side of the toothed wheels 5, 5' there are provided pair of connecting journals 2, 2' each having a diameter which is approximately twice as large as that of the measuring shaft 6. The connecting journal 2 is arranged connected with a joint yoke 1 of a universal joint (not shown) with the yoke 1 being connected through a joint spider with a second joint yoke (not shown) associated with a drive shaft.

The connecting journal 2' on the opposite side of the measuring device is formed with a receiving flange which, as shown in FIG. 1, may be connected to a slip-on sleeve for the power take off shaft of a tractor.

Both the connecting journals 2 and 2' are supported within housing means of the invention, to be described more fully hereinafter, by means of a pair of bearings 7, 7' which are arranged within a pair of bearing support members 4, 4' each of which are joined together in nonrotative engagement relative to each other by bracket means 10.

Housing covers 3 and 3' are provided on opposite sides of the housing means in order to protect the bearings 7, 7' and the bearing support members 4, 4', and the covers 3, 3' will provide seals against penetration of dirt or other deleterious material which cannot be avoided in agricultural environments.

Sensor means comprising sensors 8 and 8' which may, for example, be differential magnetoresistor sensors, are connected to the bearing support members 4, 4' in such a way that they are arranged at a radial distance of approximately 0.1 mm from the wheels 5, 5'.

In order to protect the space between the two bearing support members 4, 4' against penetration of dirt, the housing of the invention is formed to include a tubular member 9 which is formed of resilient material and which operates to enable a certain amount of bending deformation in the measurement device.

Thus, it will be noted that the housing means of the invention are formed to include the resilient tubular member 9, having the bearing support members 4, 4' attached thereto, with the bearing members 7, 7', which support the journals 2, 2', being mounted in the bearing support members 4, 4' of the housing means.

Figure 1A:
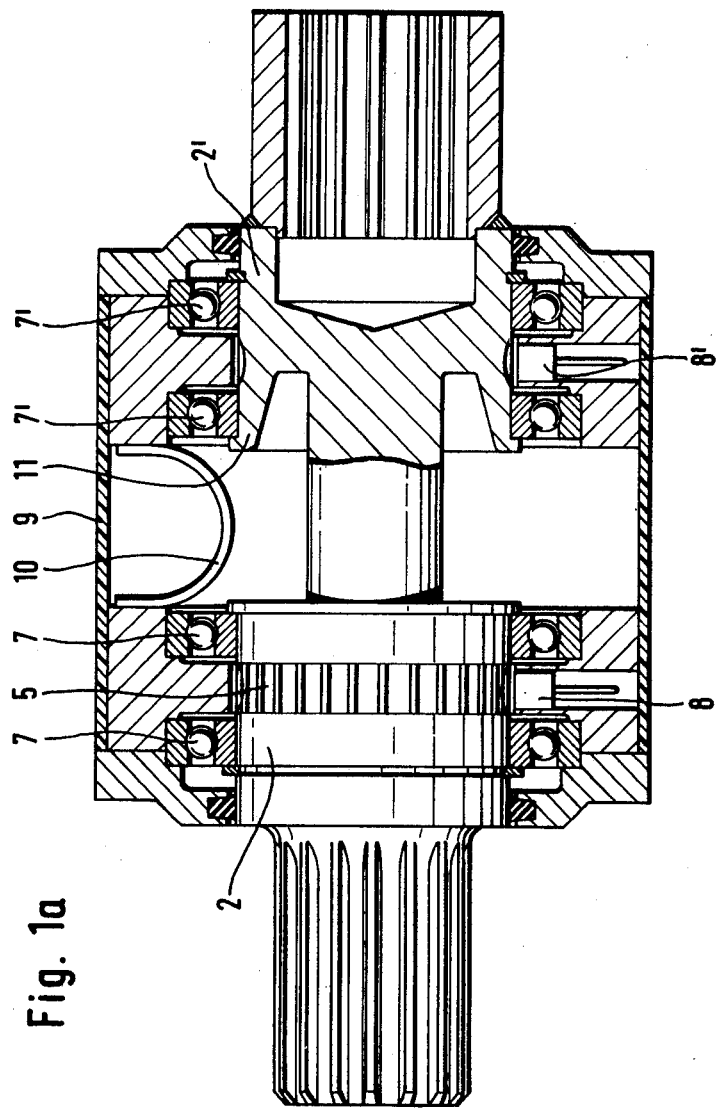
FIG. 1a is a sectional view illustrating a measuring device having bearing collars which are directed radially inwardly at the outer circumference of toothed wheels of the device and which is designed to receive a further support bearing.

An alternative arrangement of the present invention is shown in FIG. 1a wherein a reinforced design for the measuring device is provided, preferably used for high performance implements driven by tractors whose engine output exceeds 75 kw (100 HP). It will be noted that in FIG. 1a, each of the toothed wheels 5, 5' has been provided with a radially outwardly positioned bearing collar 11 directed axially inwardly and serving to receive therein a second supporting bearing 7, 7'. It should be noted that in FIG. 1a the part to the right is shown in cross-sectional view. The sensors 8, 8' are arranged within a radial bore provided in the bearing support members 4, 4'.

Figure 1B:
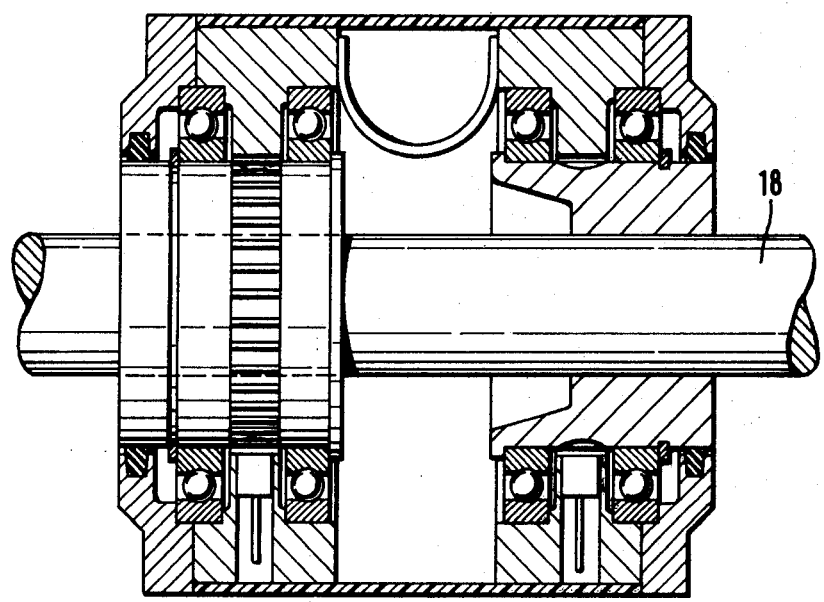
FIG. 1b is a cross-sectional view through a measuring device having hollow connecting journals for receiving an existing drive shaft as a measuring shaft.

Another alternative of the invention is shown in FIG. 1b wherein the measuring device shown is particularly suitable for being fitted in an existing drive line of an agricultural implement. The existing drive shaft 18 is simultaneously used as the measuring shaft and the connecting journals are designed in such a way that they may be rotatively affixed with the drive shaft 18.

Figure 2:
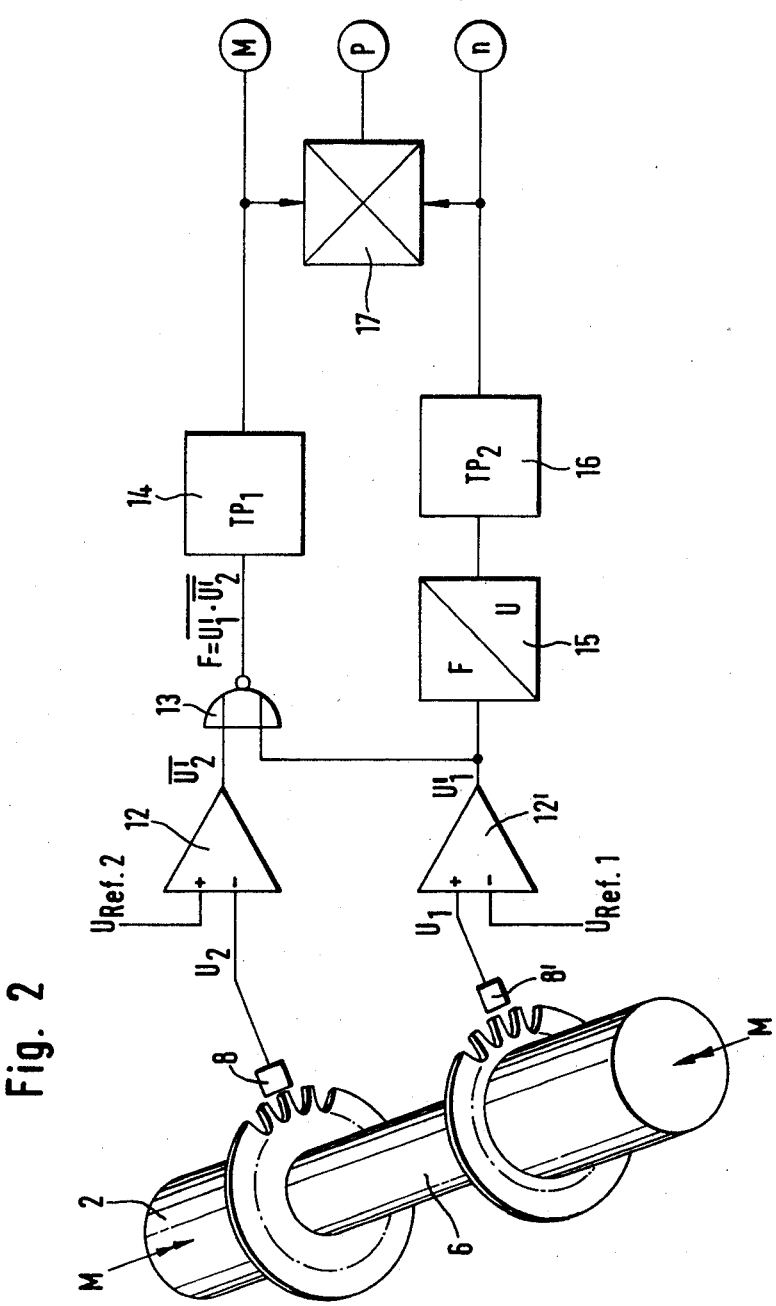
FIG. 2 is a schematic diagram illustrating an electronic evaluating system of the invention.

FIG. 2 shows in schematic form the electronic evaluating system which may be utilized with the present invention. As indicated in FIG. 2, each of the sensors 8, 8' cooperating with one of the toothed wheels 5, 5' is connected to an operational amplifier with one sensor 8 being connected to an inverting input of an operational amplifier 12 and the other sensor 8' being connected to the noninverting input of an operational amplifier 12'.

The operational amplifiers are wired as comparators and by modifying $U_{Ref.1}$ and $U_{Ref.2}$, it is possible to effect a null balance of the indication in the torque-free condition on the operational amplifiers 12 and 12'.

The outputs of the operational amplifiers 12, 12' are connected to each other through a NOR gate 13 which produces the function $F = U_1' \times U_2'$ from which a low-pass filter 14 connected to the output side forms a voltage proportional to the static moment. In order to enable the low-pass filter 14 to record the static moment, it is preferably to adjust it to a limit frequency of less than one Hertz. By additionally providing a low-pass filter (not illustrated) with a limit frequency of less than 20 Hertz, it is possible to record the dynamic moment as well.

In addition to applying the outputs of the operational amplifiers 12, 12' as inputs to the NOR gate 13, the output side of the noninverting operational amplifier 12' is also connected to a frequency voltage transformer 15 which supplies a voltage proportional to the speed, with the tooth frequency and the movement irregularities which are unavoidable with articulated drive shafts being filtered out in a low-pass filter 16 connected to the output side of the frequency voltage transformer 15.

A multiplier 17 has applied thereto inputs from both the low-pass filters 14 and 16, and in the multiplier 17 torque signals are combined with speed signals so that an output signal P representing performance may be obtained.

Figure 3:
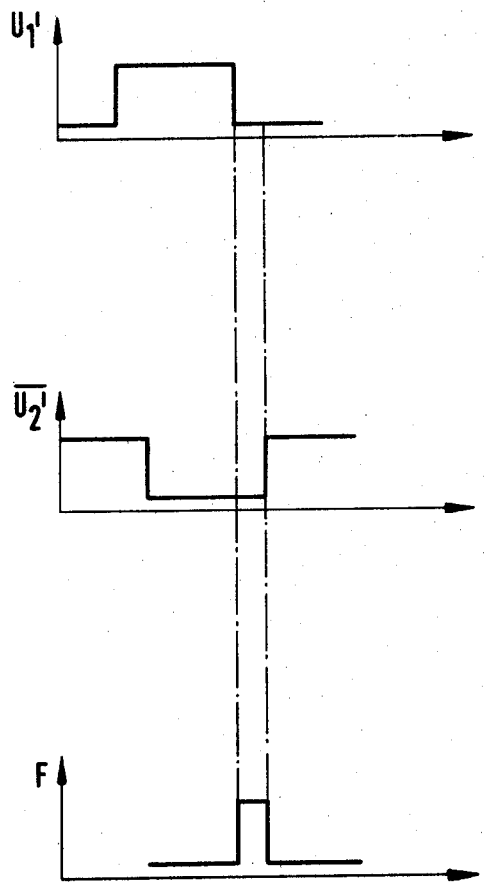
FIG. 3 shows graphs depicting functions of the connection of two operational amplifier outputs by an NOR gate of the system depicted in FIG. 2.

FIG. 3 shows the connection between the outputs of the two operational amplifiers 12 and 12' in the comparator. The positive pulse of the noninverting operational amplifier is matched by the negative pulse of the inverting operational amplifier. As can be seen in the two upper diagrams, the two pulses of equal length are out of phase in terms of time by a value corresponding to the torque value. As the output of the NOR gate is set to H only if both inputs of the gate are loaded with L, the width of the pulse H at the output of the NOR gate corresponds to the phase displacement and is a direct measure of the prevailing torque value.

While specific embodiments of the invention have been shown and described in detail to illustrate the application of the inventive principles, it will be understood that the invention may be embodied otherwise without departing from such principles.

What is claimed is:

1. A device for measuring torque in a drive shaft particularly in the drive line between the power take off shaft of a tractor and an agricultural implement comprising:
   a torsion-loaded measuring shaft;
   a pair of toothed wheels rotatively fixed, respectively, at opposite ends of said shaft;
   connecting journals adjacent each of said toothed wheels axially outwardly thereof, said connecting journals being dimensioned with a diameter which is approximately twice the diameter of said measuring shaft;
   a housing including a pair of bearing support means each having bearings for rotatably supporting said connecting journals, a resilient tubular member extending between said bearing support means and bendable bracket means connecting said bearing support means together in rotatively fixed engagement; and
   sensor means supported on said bearing support means in contact-free operative association with said toothed wheels to sense phase displacement therebetween proportional to torque in said measuring shaft.

2. A device according to claim 1 wherein each of said toothed wheels is provided at its outer circumference with a bearing collar directed axially inwardly for receiving a further support bearing.

3. A device according to claim 1 wherein said sensor means comprise differential magnetoresistor sensors.

4. A device according to claim 1 wherein said sensor means comprise inductive sensors.

5. A device according to claim 1 or 3 wherein said measuring shaft is comprised of a drive shaft forming a component of a machine to be driven, with said connecting journals being hollow journals including means for affixing said journals to said drive shaft.

6. A device according to claim 1 further including an electronic evaluating system responsive to said sensor means comprising a switching mechanism consisting essentially of one inverting and one noninverting operational amplifier wired as a comparator whose outputs are applied through a NOR gate to a first low-pass filter connected to the output side of said NOR gate for recording torque with the output of said noninverting operational amplifier being further applied to a frequency voltage transformer with the output of said frequency voltage transformer being applied to a second low-pass filter, the outputs of both said first and said second low-pass filters being connected to a multiplier for combining torque and speed signals for obtaining a performance parameter.

* * * * *